(12) United States Patent  
Krieger

(10) Patent No.: US 9,828,272 B2  
(45) Date of Patent: Nov. 28, 2017

(54) MOBILE WASTEWATER TREATMENT SYSTEM

(71) Applicant: JKKG, LLC, Dallas, TX (US)

(72) Inventor: Joseph P. Krieger, Edmond, OK (US)

(73) Assignee: JKKG, LLC, Dallas, TX (US)

( * ) Notice: Subject to any disclaimer, the term of this patent is extended or adjusted under 35 U.S.C. 154(b) by 24 days.

(21) Appl. No.: 14/920,724

(22) Filed: Oct. 22, 2015

(65) Prior Publication Data

US 2016/0115062 A1 Apr. 28, 2016

Related U.S. Application Data

(60) Provisional application No. 62/067,892, filed on Oct. 23, 2014.

(51) Int. Cl.
| | |
|---|---|
| C02F 9/00 | (2006.01) |
| C02F 1/24 | (2006.01) |
| C02F 103/10 | (2006.01) |
| C02F 1/00 | (2006.01) |
| C02F 1/28 | (2006.01) |
| C02F 1/52 | (2006.01) |
| C02F 1/72 | (2006.01) |

(52) U.S. Cl.
CPC .............. *C02F 9/00* (2013.01); *C02F 1/004* (2013.01); *C02F 1/24* (2013.01); *C02F 1/283* (2013.01); *C02F 1/286* (2013.01); *C02F 1/5236* (2013.01); *C02F 1/5245* (2013.01); *C02F 1/722* (2013.01); *C02F 2103/10* (2013.01); *C02F 2201/007* (2013.01); *C02F 2201/008* (2013.01)

(58) Field of Classification Search
CPC ...... C02F 1/004; C02F 9/00; C02F 2201/007; C02F 2201/008

USPC .................................................. 210/241, 259
See application file for complete search history.

(56) References Cited

U.S. PATENT DOCUMENTS

| | | | |
|---|---|---|---|
| 1,800,168 A | 4/1931 | Brauer et al. |
| 4,267,022 A | 5/1981 | Pitcher |
| 4,668,345 A | 5/1987 | Warren |
| 5,173,184 A | 12/1992 | Krieger |

(Continued)

FOREIGN PATENT DOCUMENTS

| | | |
|---|---|---|
| RU | 2060354 | 5/1996 |
| WO | 93/18834 | 9/1993 |
| WO | 2004/056442 | 7/2004 |

OTHER PUBLICATIONS

Kalinina I.P., et al; Istochniki Zagryazneniya Okruzhayushei Sredy NA Promyslakh. Neftegazovye Tekhnologii: SB.Trudov Mezhdunarodnoi Nauchno-Prakticheskoi Konferentsii. Tom 1. Samara, Samarsky Gosudarstvenny Tekhnichesky Universitet, 2010, p. 21.

(Continued)

*Primary Examiner* — Christopher Upton  
(74) *Attorney, Agent, or Firm* — Jackson Walker LLP; Christopher J. Rourk; Thomas B. Hayes

(57) ABSTRACT

A mobile wastewater treatment facility, comprising a first vehicle having one or more first water treatment systems, a second vehicle having one or more second water treatment systems and wherein the first vehicle and the second vehicle are modular, and the first water treatment systems and second water treatment systems are configurable in combination to process contaminated water as a function of the type of contamination.

14 Claims, 12 Drawing Sheets

(56) References Cited

U.S. PATENT DOCUMENTS

| | | | |
|---|---|---|---|
| 5,288,737 A | 2/1994 | Krieger | |
| 5,383,241 A | 1/1995 | Krieger | |
| 5,423,981 A | 6/1995 | Krieger | |
| 5,534,159 A | 7/1996 | Krieger | |
| 5,538,598 A | 7/1996 | Schlesinger et al. | |
| 5,609,769 A | 3/1997 | Krieger | |
| 5,755,973 A | 5/1998 | Krieger | |
| 6,033,566 A | 3/2000 | Averill et al. | |
| 6,884,347 B1 | 4/2005 | Krieger | |
| 7,513,934 B2* | 4/2009 | Adam | B01D 17/0214 210/241 |
| 7,947,176 B1* | 5/2011 | Jamieson | C02F 9/00 210/241 |
| 2008/0105529 A1 | 5/2008 | Burke et al. | |
| 2010/0326075 A1 | 12/2010 | Fong | |
| 2012/0312755 A1* | 12/2012 | Ryan | C02F 1/5281 210/749 |
| 2013/0270183 A1* | 10/2013 | Snydmiller | C02F 9/00 210/767 |
| 2014/0021137 A1* | 1/2014 | Smiddy | C02F 9/005 210/691 |
| 2014/0144849 A1 | 5/2014 | Wojtaszczyk | |
| 2015/0060369 A1* | 3/2015 | Richie | C02F 1/5281 210/723 |
| 2015/0368136 A1* | 12/2015 | Raymont | C02F 9/00 210/662 |

OTHER PUBLICATIONS

Russian Patent Office; International Search Report and Written Opinion; PCT Application No. PCT/US2014/012966, dated Jul. 3, 2014.

The International Bureau of WIPO; International Preliminary Report on Patentability; PCT Application No. PCT/US2014/012966; dated Aug. 6, 2015.

* cited by examiner

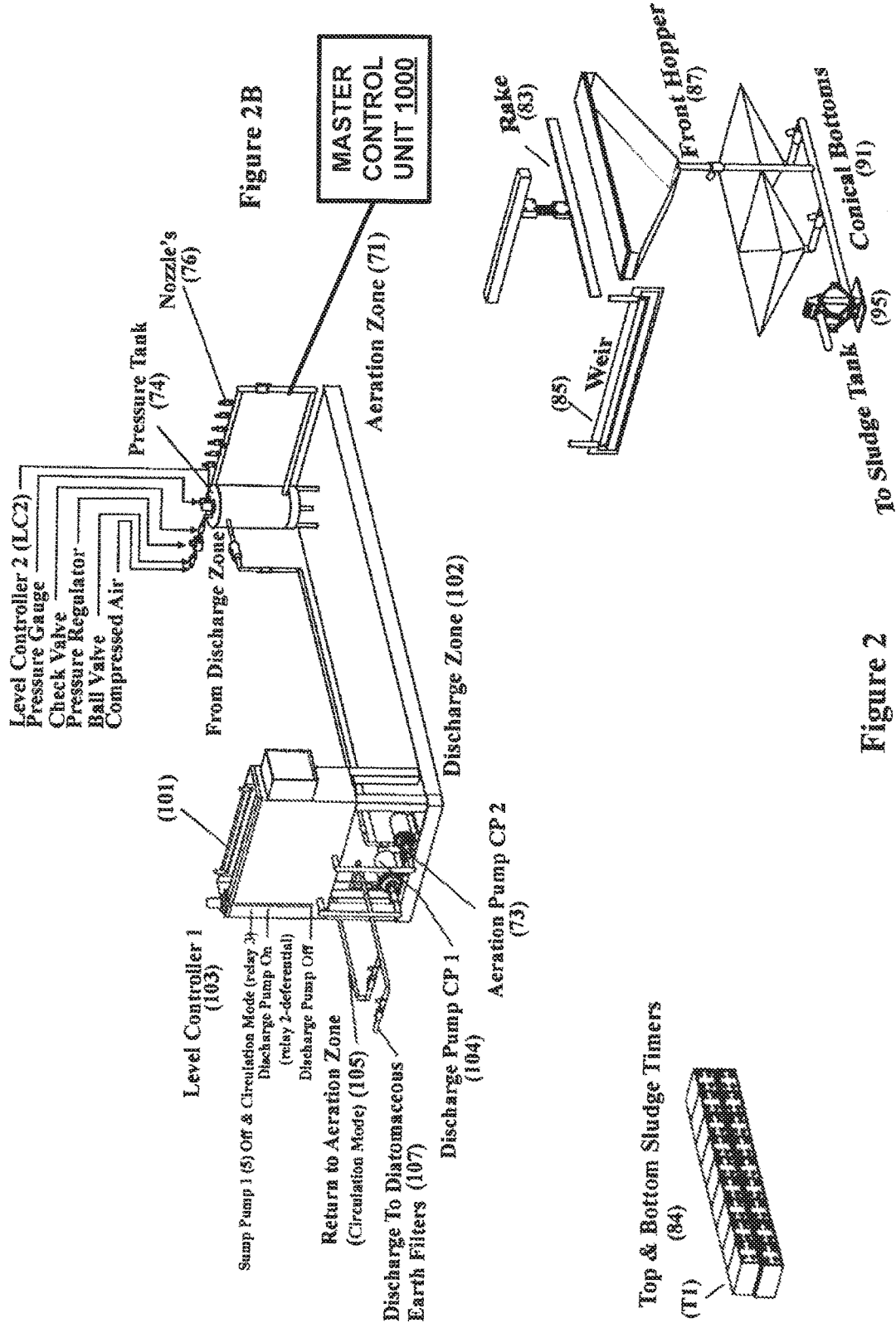

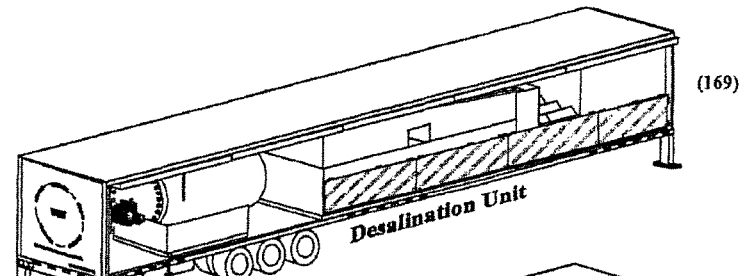
Figure 6A
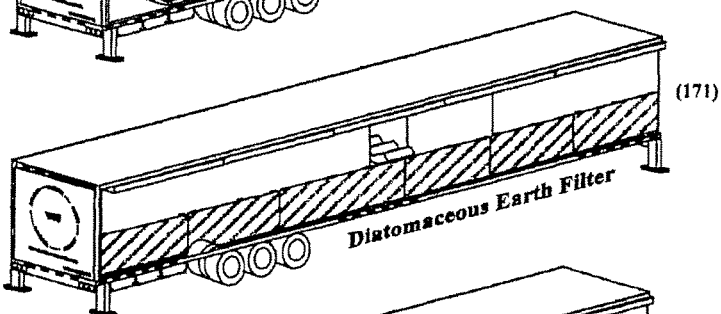
Figure 6B
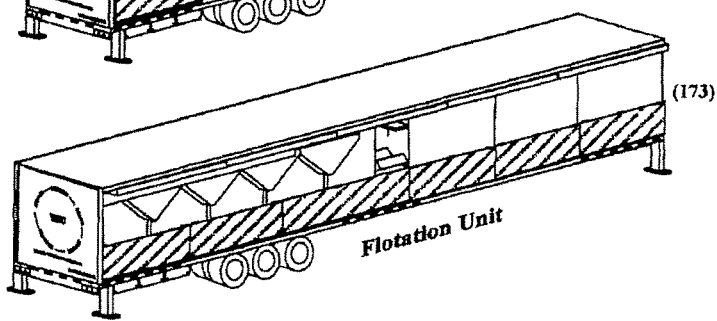
Figure 6C
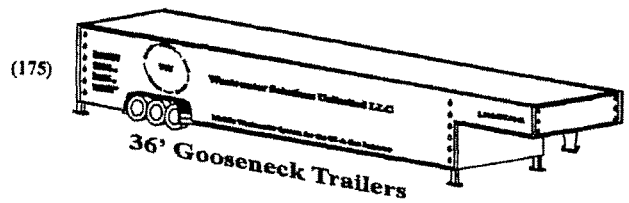
Figure 6D
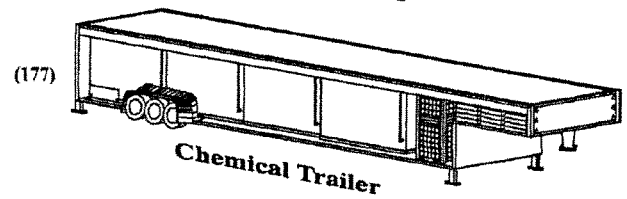
Figure 6E
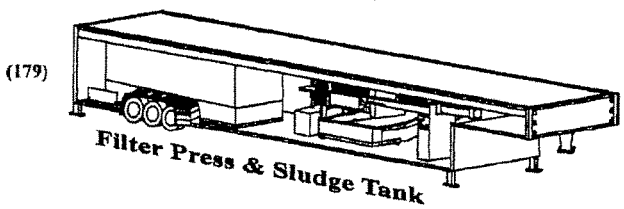
Figure 6F
Figure 6

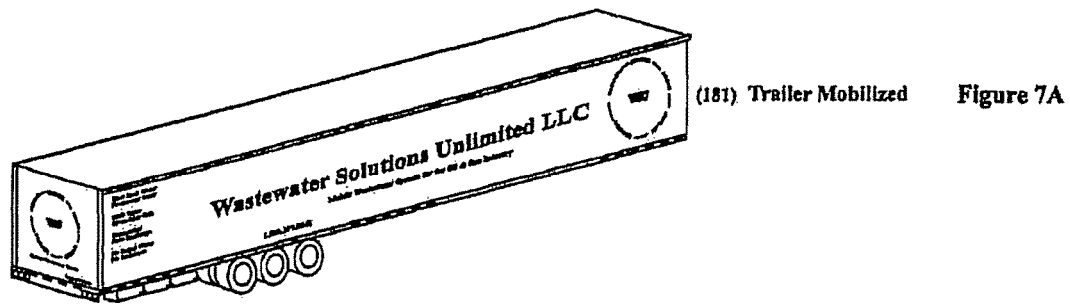
(181) Trailer Mobilized  Figure 7A
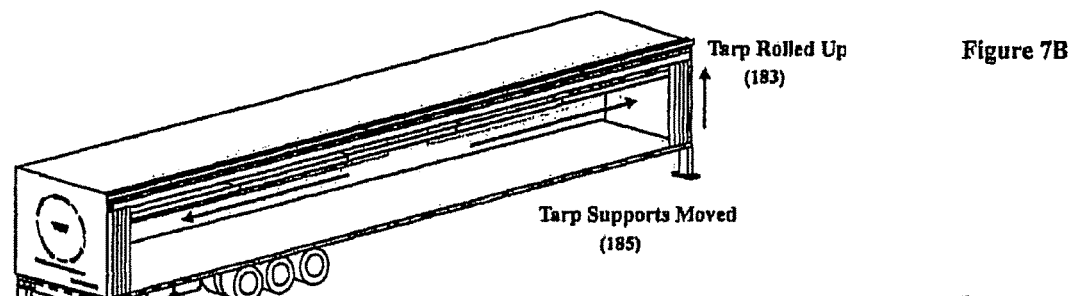
Tarp Rolled Up (183)  Figure 7B
Tarp Supports Moved (185)
(195) Down Riggers Dropped
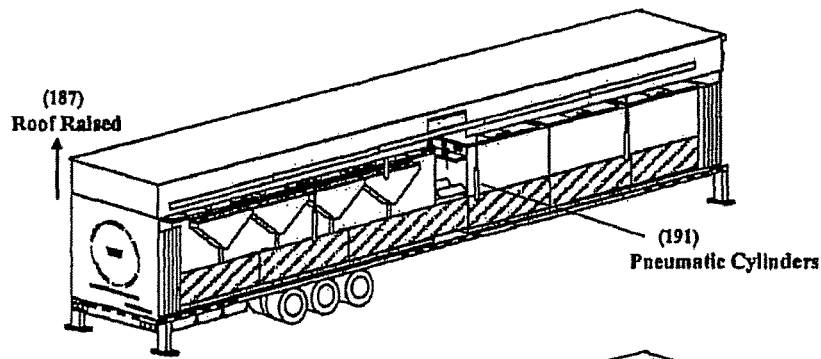
(187) Roof Raised
Figure 7C
(191) Pneumatic Cylinders
Figure 7
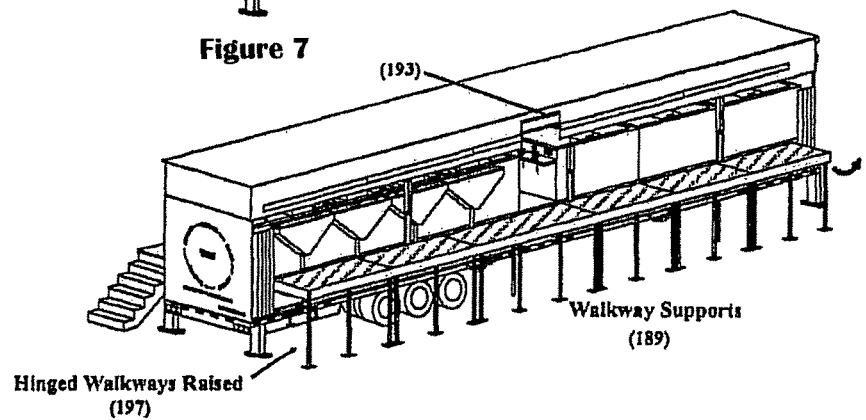
(193)
Hinged Walkways Raised (197)
Walkway Supports (189)
Figure 8

MOBILE WASTEWATER TREATMENT SYSTEM

The present application claims priority to U.S. Ser. No. 62/067,892, filed Oct. 23, 2014, which is hereby incorporated by reference for all purposes as if set forth herein in its entirety.

TECHNICAL FIELD

The present disclosure relates generally to water treatment, and more specifically to a mobile wastewater treatment system.

BACKGROUND OF THE INVENTION

Wastewater treatment plants are usually capital-intensive permanent facilities.

SUMMARY OF THE INVENTION

A mobile wastewater treatment facility is disclosed that includes a first vehicle having one or more first water treatment systems, such as a desalination unit, and a second vehicle having one or more second water treatment systems, such as a filter unit or flotation unit. The first vehicle and the second vehicle are modular, and the first water treatment systems and second water treatment systems are configurable in combination to process contaminated water as a function of the type of contamination, so as to allow either or both of the first water treatment system and the second water treatment system to be supplemented or omitted as needed, such as to provide three desalination units and one filter unit, one desalination unit and three filter unit, or so forth.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIGS. 2A and 2B are diagrams of a flotation unit, in accordance with an exemplary embodiment of the present disclosure;

FIGS. 6A, 6B, 6C, 6D, 6E and 6F are diagrams of trailers, in accordance with an exemplary embodiment of the present disclosure;

FIGS. 7A, 7B and 7C are diagrams of a system setup, in accordance with an exemplary embodiment of the present disclosure;

FIG. 8 is a diagram of a work space, in accordance with an exemplary embodiment of the present disclosure;

DETAILED DESCRIPTION OF THE INVENTION

Figure 1A:
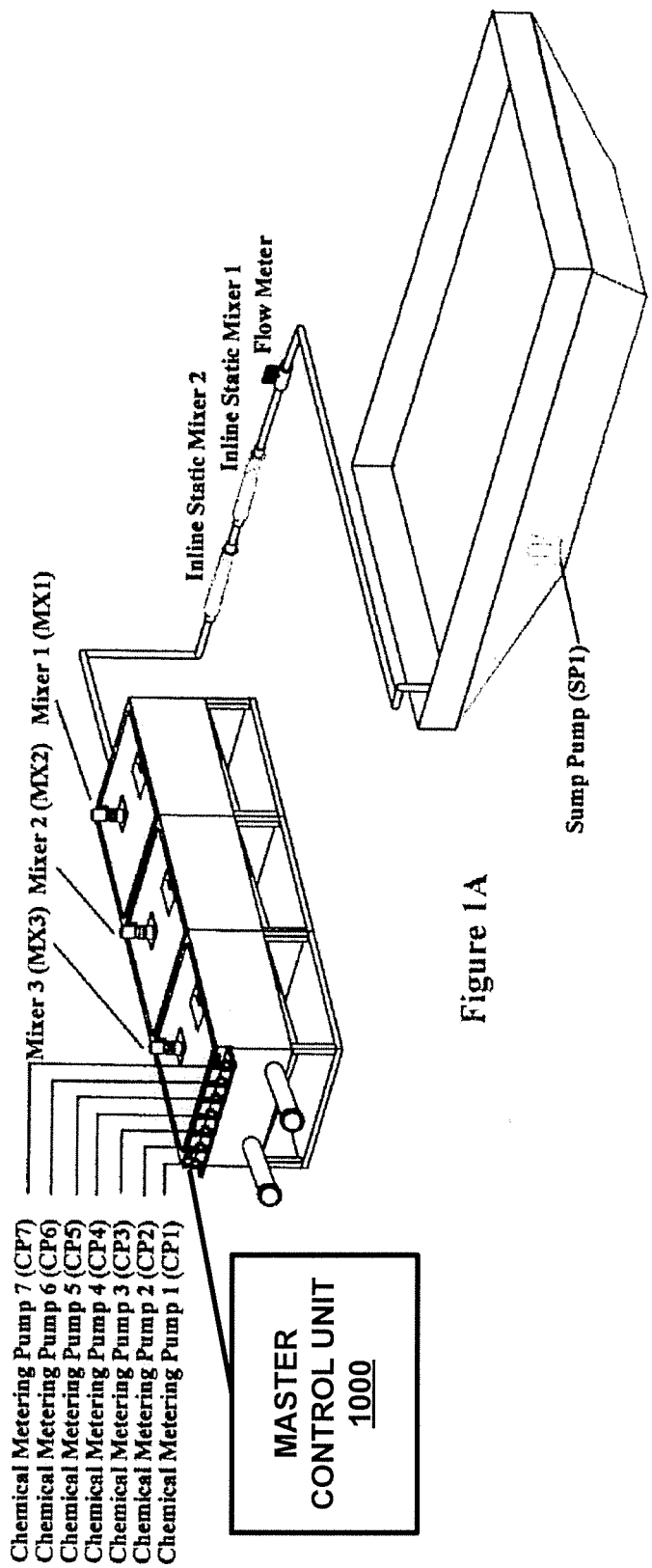
FIGS. 1A and 1B are diagrams of chemical mixing tanks, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Figures 1, 1B:
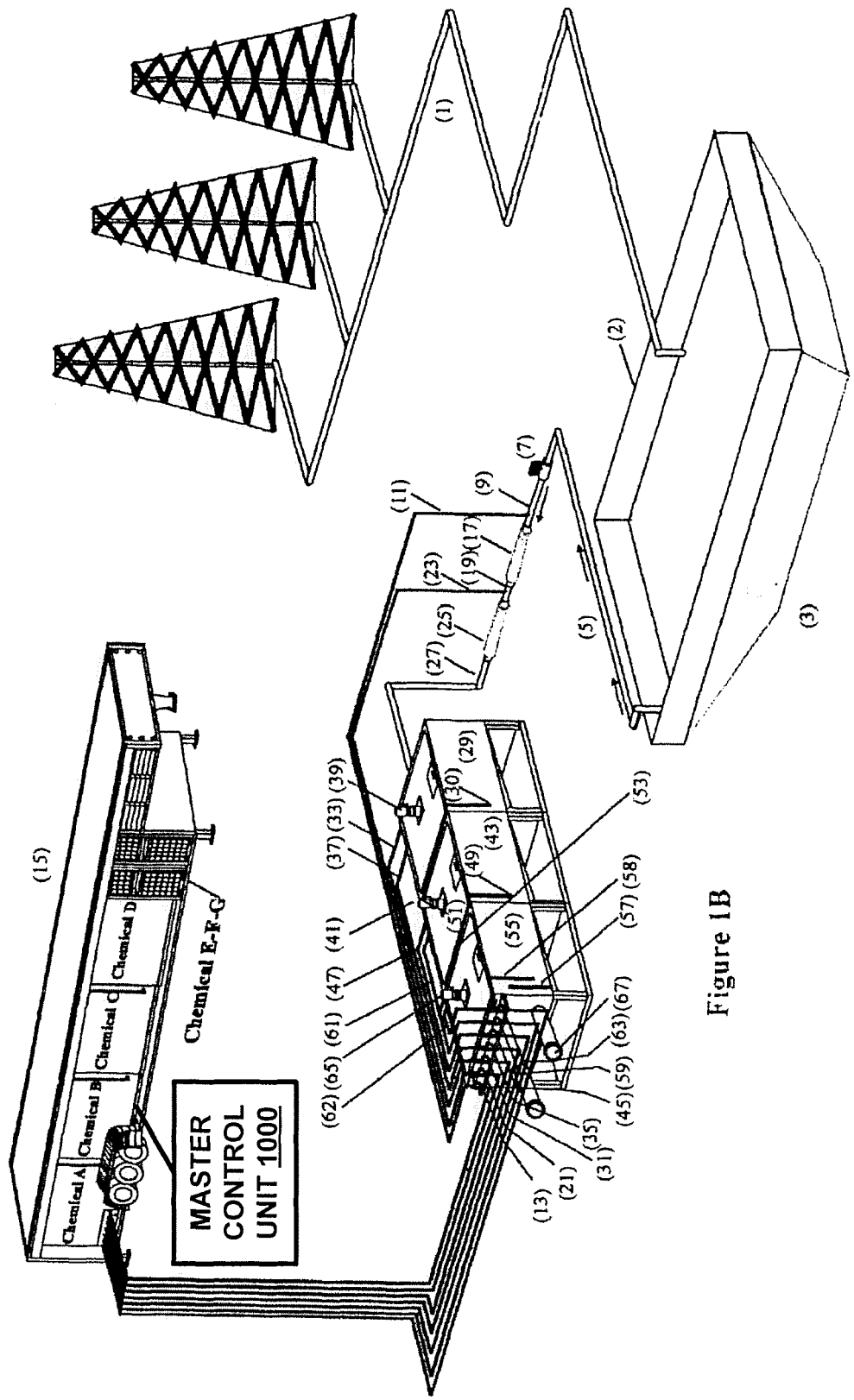

FIGS. 1A and 1B are diagrams of chemical mixing tanks, in accordance with an exemplary embodiment of the present disclosure. In one exemplary embodiment, water from a drilling process, a fracking process or other suitable processes, such as for oil and natural gas recovery or other suitable purposes, flows to impoundment pit (2) through conduit (1), which can be provided as part of the infrastructure installed by oil companies or other suitable parties, as a means of capturing the flow-back and produced water to be treated and reused for future fracking operations.

A mobile wastewater system can be placed near the impoundment pit (2). Sump pump (3) or other suitable devices can be used to transfer the water through conduit (5) to flow meter (7), which is used to measure the total the number of gallons of flow-back and produced water that has been processed. The water flows from flow meter (7) through conduit (9). Chemical A (11) from the chemical trailer (15) is injected into conduit (9) by chemical metering pump (13). The water then flows through conduit (9) into a mixing device such as static mixer (17) or other suitable devices to mix chemical A with the water. The water flows through static mixer (17) and is discharged into conduit (19). Chemical B (23) from chemical trailer (15) is injected into conduit (19) by chemical metering pump (21), or is added in other suitable manners. The water is then discharged from conduit (19) and flows to second static mixer (25) to mix chemical B (23) with the water. The water is then discharged from static mixer (25) through conduit (27) and enters compartment 1 (29) of the chemical mixing tanks.

Compartment 1 (29) includes mixer (39) or other suitable devices that are used to mix the chemicals with the water. The compartments are configured to allow 8-10 minutes of retention time to allow the chemicals to fully react. Chemical C (33) is pumped from chemical trailer (15) by chemical metering pump (31) or other suitable devices or systems, and is injected into compartment 1 (29). Chemical D (37) is pumped from chemical trailer (15) by chemical metering pump (35) or other suitable devices or systems, and is also injected into compartment 1 (29). The water is mixed with the chemicals and flows under baffle (30) upwards and spills over flume (41), which can be suitably placed, such as 3" lower than conduit (27), so as to spill the water into compartment 2 (43).

The water then spills into compartment 2 (43) from compartment 1 (29). Compartment 2 (43) includes mixer (51) or other suitable devices or systems that are used to mix the chemicals with the water. Chemical E (47) is pumped from chemical trailer (15) by chemical metering pump (45) and is injected into compartment 2 (43). Chemical F (61) is pumped from chemical trailer (15) by chemical metering pump (59) or other suitable devices or systems and is also injected into compartment 2 (43). The water is mixed with the chemicals and flows under baffle (49) upwards and spills over flume (53), which can be suitably placed, such as 3" lower than flume (41), to spill the water into compartment 3 (55), or in other suitable configurations.

The water then spills into compartment 3 (55) from compartment 2 (43). Compartment 3 (55) has mixer (65) or other suitable devices or systems attached to mix the chemicals with the water. In a similar manner as compartment 2, Chemical F (61) is pumped from chemical trailer (15) by chemical metering pump (59) and is injected into compartment 3 (55). Chemical G (62) is pumped from the chemical trailer (15) by chemical metering pump (63) and is also injected into compartment 3 (55). The water is mixed with the chemicals and flows under baffle (58) upwards and spills over baffle (57), which can be placed 3" lower than flume (53) or in other suitable configurations. The water flows from compartment 3 (55) into two 6" conduits (67), and then flows into the aeration zone of the flotation unit (69).

Master control unit 1000 can be coupled to one or more components shown in FIGS. 1A and 1B, including but not limited to sump pump (3), flow meter (7), chemical metering pump (13), static mixer (17), chemical metering pump (21), second static mixer (25), chemical metering pump (31), chemical metering pump (35), mixer (51), chemical metering pump (45), chemical metering pump (59), mixer (65), chemical metering pump (59), chemical metering pump (63), or other suitable components, such as by using a wireless or wireline electrical and data connection, and can provide centralized system monitoring and control. In one exemplary embodiment, master control unit 1000 can be a control processor that is configurable to receive data and control inputs from a plurality of different devices, such as pumps, meters, mixers, temperature sensors, flow sensors, pressure sensors, level sensors or other suitable systems and components, and to generate user-configurable system monitoring and control interfaces, such as by dragging and dropping a first modular trailer icon and a second modular trailer icon into a configuration zone on a user display, and by generating one or more connection indicators for a user to assist with the connection of modular piping, electrical and data connections. Likewise, after system setup and connections are completed, master control unit 1000 can generate system testing protocols for the selected system configuration, can run self-tests for the selected system configuration, can generate system operation instructions for the selected system configuration and can perform other suitable functions in support of the modular and user-configurable system disclosed herein.

In one exemplary embodiment, chemical A can be calcium hydroxide, sodium hydroxide, potassium hydroxide or hydrated lime, chemical B can be hydrogen peroxide, magnesium peroxide or sodium peroxide, chemical C can be poly-aluminum chloride, magnesium chloride, calcium chloride or sodium chloride, chemical D can be a coagulant, chemical E can be caustic soda, chemical F can be a flocculent, and chemical G can be nitric acid, sulfuric acid, hydrofluoric acid or hydrochloric acid, or other suitable chemicals or combinations of chemicals can also or alternatively be used. In addition, all pipe sizes and configurations are exemplary, and other suitable pipe sizes and configurations can also or alternatively be used.

Figure 2A:
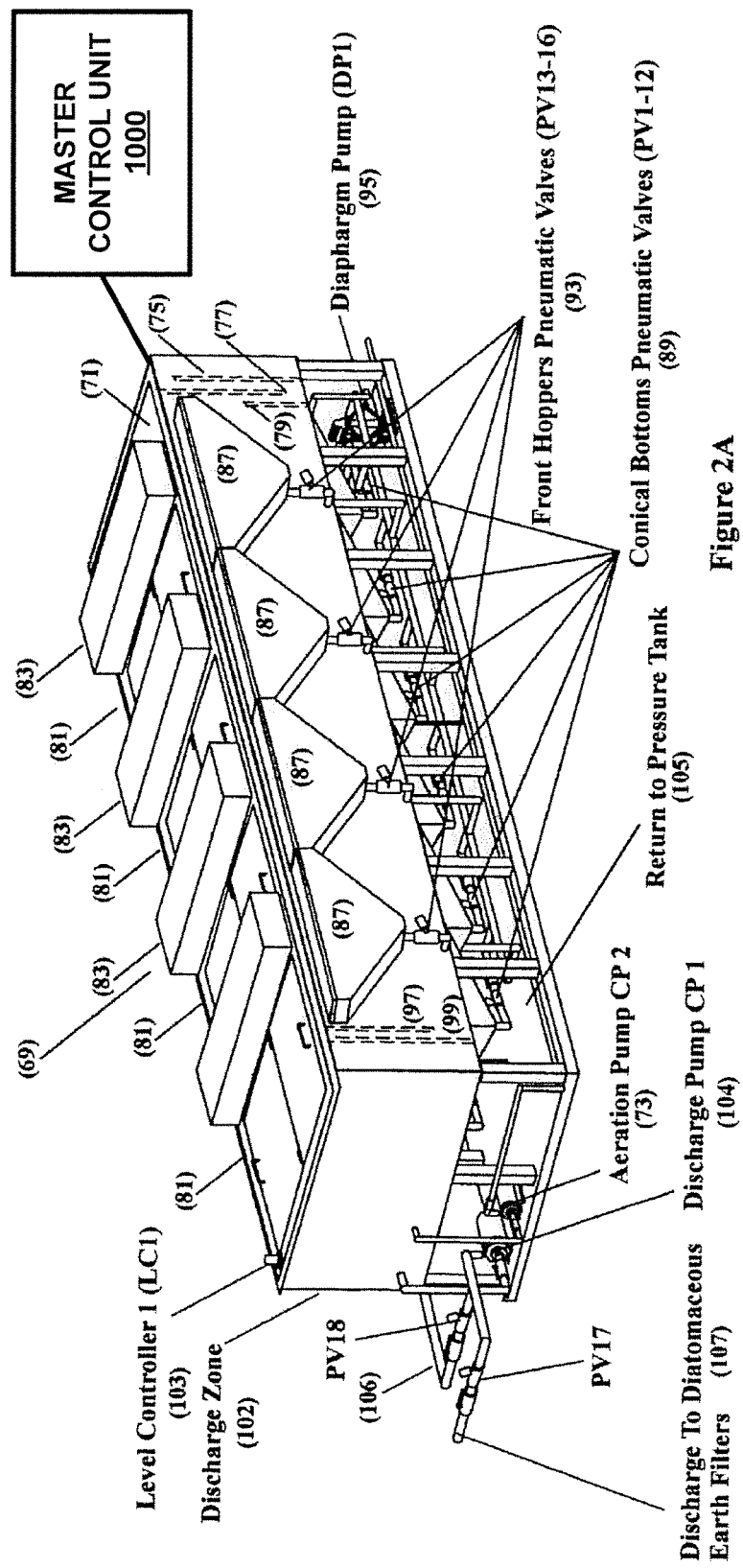
Figure 3A:
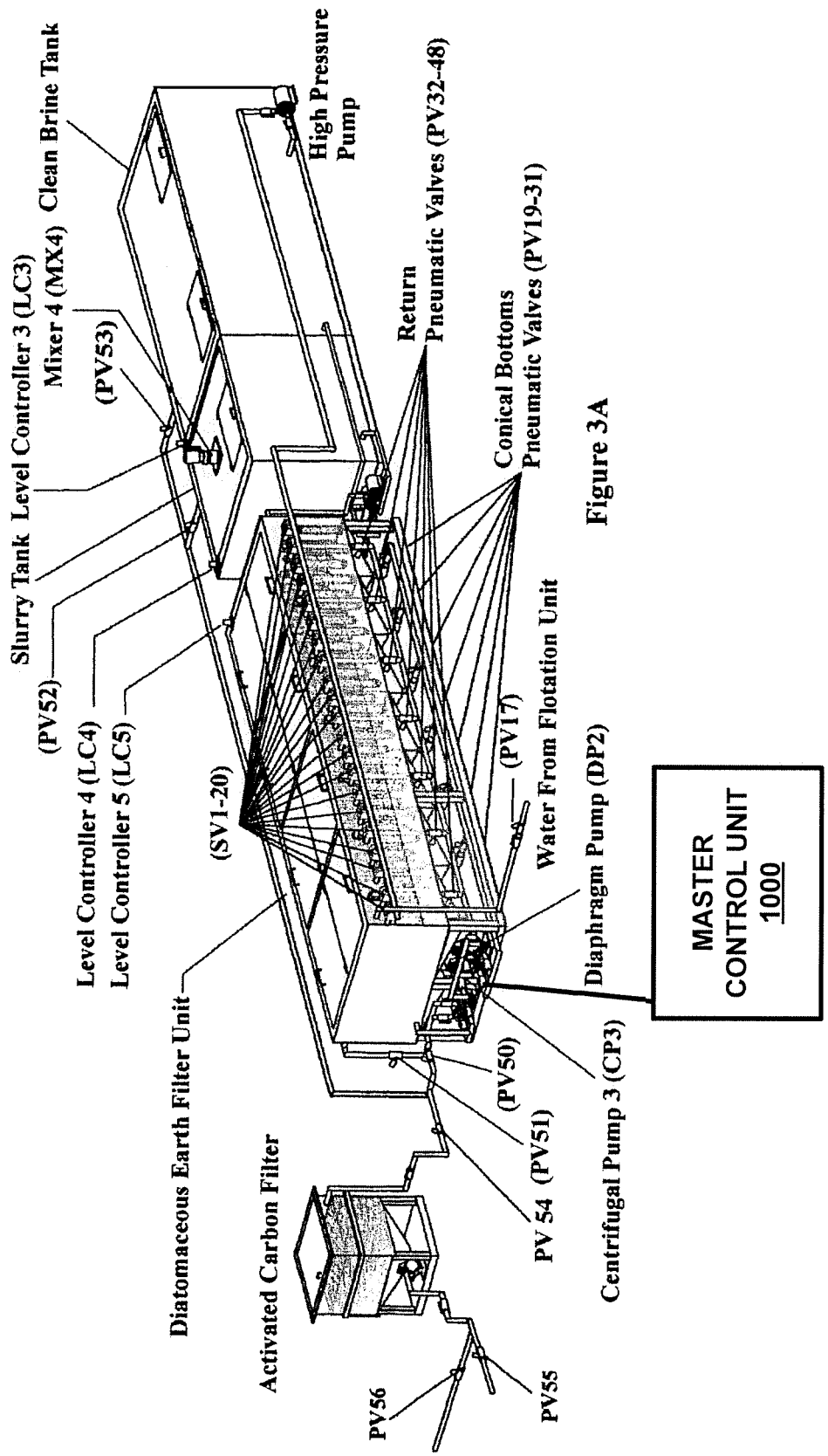
FIGS. 3A, 3B, 3C and 3D are diagrams of a diatomaceous earth filter, in accordance with an exemplary embodiment of the present disclosure.
Figure 3:
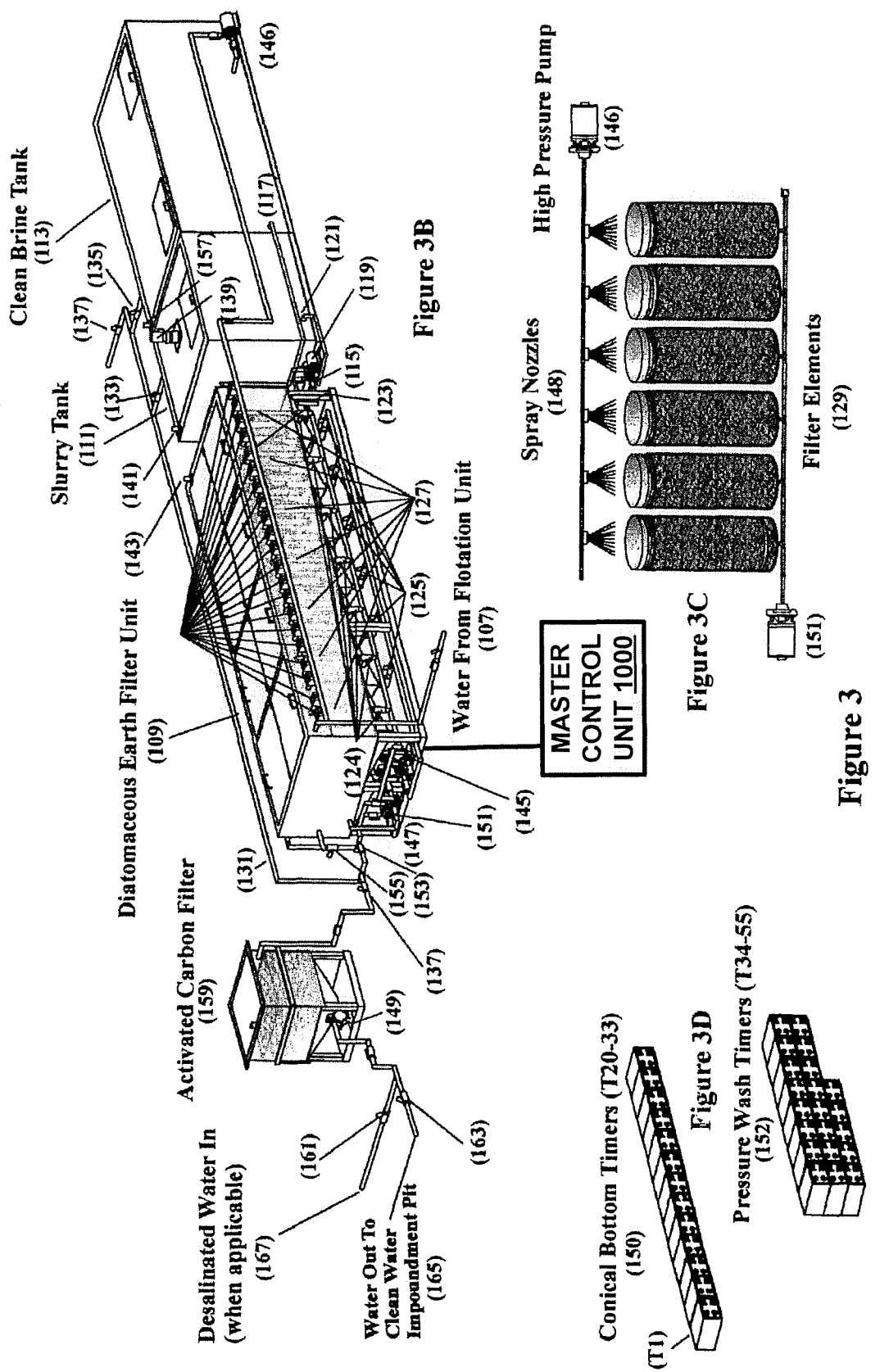

FIGS. 2A and 2B are diagrams of a flotation unit, in accordance with an exemplary embodiment of the present disclosure. Flotation unit (69) includes aeration zone (71), flotation zone (81), discharge zone (102) and other suitable components. The water flows into the aeration zone from conduits (67) of compartment 3 (55). The water in aeration zone (71) is saturated with "white water," which is water with minute bubbles that attach to the flocculated particulate to create a more buoyant flocculate. The water flows over baffle (75) and under baffle (77). Baffle (79) deflects the particulate upwards to the surface of flotation zone (81). The water flows through flotation zone (81) and flows under baffle (97) upward to spill over weir (101) attached to baffle (99) into discharge zone (102).

Discharge zone (102) can include level controller (103) that energizes and de-energizes discharge pump (104) at a pre-determined level. Level controller 1 (103) receives common contact power from level controller 4 (143) normally closed relay 3 of the diatomaceous earth filter (109). Normally closed relay 3 of level controller 4 (143) can close pneumatic valve PV17 installed in line with conduit (107) and open pneumatic valve PV18 installed in line with conduit (106), which places the flotation unit into circulation mode when the water rises to relay 3 of the diatomaceous earth filter (109). Relay 3 also de-energizes sump pump (3) to interlock the components, such as to prevent an overflow or when the filter elements (129) are being pre-coated. Relay 3 of level controller 4 (143) is connected to a latching relay to prevent the pneumatic valves from changing state when the water lowers in the diatomaceous earth filter (109). In normal operation, normally open relay 2 of controller (103)

differentially opens pneumatic valve PV17 to discharge the water to diatomaceous earth filter (109).

A second centrifugal pump (73) is also attached to discharge zone (102). Centrifugal pump (73) pumps clean water to pressure tank (74). Compressed air is discharged in pressure tank (74) to create "white water" and the water/air mix is released into aeration zone (71) through nozzles (76).

The flotation unit (69) has an automatic sludge removal system for both the top and bottom sludge. The sludge removal system includes a bank of timers (84). A master timer (T1) starts the sequence for the top sludge removal. The master timer is timed with off delay.

When master timer T1 times out, a signal is relayed to solenoid valves to activate diaphragm pump (95), to raise weir (85), to start rakes (3), and to begin a control sequence that results in sending a signal to timers T2 through T5, which can be daisy chained together to open and close pneumatic valves PV13 through PV16 for a pre-determined time period. Rakes (83) move the top sludge into front hoppers (87), where the sludge is transferred to sludge tank (180) located in trailer (179). This sequence continues for a pre-determined period of time, depending on the settings of the master timer T1. When the master timer (on delay) times out the diaphragm pump (95) stops, rakes (83) move back to the home position, weir (85) lowers and the sequence stops of pneumatic valves PV-13-16.

The bottom sludge removal also has a master timer T6 to control how long and how often the bottom sludge is removed from the conical bottoms (91). When master timer T6 (off delay) times out, a sequence is started opening and closing pneumatic valves PV1-12 to remove the sludge one cone at a time, and to keep the conical bottoms from cavitation. The timers T7-T18 are daisy chained together to create the sequence. When the master timer T6 times out the diaphragm pump (95) stops and PV1-12 closes.

Master control unit 1000 can be coupled to one or more components shown in FIGS. 2A and 2B, including but not limited to level controller (103), discharge pump (104), level controller 4 (143) normally closed relay 3 of the diatomaceous earth filter (109), pneumatic valve PV17, pneumatic valve PV18, relay 3 of the diatomaceous earth filter (109), sump pump (3), normally open relay 2 of controller 1 (103), second centrifugal pump (73), timers (84), master timer (T1), diaphragm pump (95), weir (85), rakes (3), pneumatic valves PV13 through PV16, diaphragm pump (95), pneumatic valves PV1 to PV12, or other suitable components, such as by using a wireless or wireline electrical and data connection, and can provide centralized system monitoring and control. Master control unit 1000 can generate user-configurable system monitoring and control interfaces, one or more connection indicators for a user to assist with the connection of modular piping, electrical and data connections, system testing protocols, run self-tests, generate system operation instructions and perform other suitable functions in support of the modular and user-configurable system disclosed herein.

FIGS. 3A, 3B, 3C and 3D are diagrams of a diatomaceous earth filter, in accordance with an exemplary embodiment of the present disclosure. Diatomaceous earth filter unit (109) includes a housing containing filter elements (129) that utilize diatomaceous earth as the filter media. When the diatomaceous earth filter unit is placed in automatic mode, water from clean brine tank (113) is transferred to filtering unit (109) by centrifugal pump (119).

A mixture of diatomaceous earth and water is mixed in the slurry tank (111) to be used for pre-coating the filter elements (129) and for "body feeding," which is pumping a small volume of slurry to the water entering diatomaceous filter (109) from flotation unit (69). A small amount of carry-over from the flotation unit (69) will occur. The body feed slurry mixes with the particulate to create a web, which allows longer runs before the filter elements become blinded by particulates and have to be re-coated.

The brine water from clean brine tank (113) and slurry tank (111) rises in diatomaceous earth filter (109) housing to a pre-determined level (123). The diatomaceous earth housing includes level controller 5 (143). As the water rises, the water reaches normally open relay 2 (differential) on level controller (143). When relay 2 is activated, centrifugal pumps (119) and (115) are de-energized, stopping the transfer of water from clean brine tank (113) and slurry tank (111). Centrifugal pump (151) is then energized, pneumatic valves (127) are opened and a sequence is activated by energizing a bank of timers T20 through T33 that are daisy chained together to open and close pneumatic valves (125) one at a time, to move settling diatomaceous earth to the surface. T19 is utilized for the length of time the water will circulate between the housing of the diatomaceous filter (109) and the filter elements (129) for a proper pre-coat.

Pneumatic valve (155) then opens, allowing the water to flow through the filter elements but leaving the diatomaceous earth behind, creating a filter media. The circulation continues for a pre-determined time period that is controlled by timer T19. When T19 times out, PV 17 becomes unlatched, which causes water to flow in from flotation unit (69). PV 50 (153) then opens to send the filtered water to activated charcoal filter (159), slurry tank (111) or clean brine tank (113) through conduit (131).

The water in the diatomaceous filter housing will gradually rise as filter elements (129) slowly become blinded. Normally closed relay 3 of level controller 5 (143) will close pneumatic valve PV17 (which is installed in-line with conduit (107)) and open pneumatic valve PV18 (which is installed in-line with conduit (106)), placing the flotation unit into circulation mode when the water rises to relay 3 of controller 5 (143) on diatomaceous earth filter (109).

When normally closed relay 3 of controller 5 is activated, centrifugal pump (151) continues to operate. Pneumatic valve PV18 remains open and the water continues to flow to activated carbon filter (159), lowering the water in the housing of diatomaceous earth filter (109). When the water level is lowered to normally closed relay 2 of level controller 5, differential centrifugal pump (151) is de-energized, pneumatic valve (127) closes, timers T20 through T33 are energized, and diaphragm pump (145) starts, transferring the spent diatomaceous earth to sludge tank (180) enclosed in trailer (179). The spent diatomaceous earth will lower to the normally open contacts of relay 1 of controller 5. The contacts will then close, to energize timers T34 through 55, starting a sequence for solenoid valves 1 through 20. Pressure pump (146) is then energized to spray water from the clean brine tank (113) onto the filter elements (129) to remove debris. The diaphragm pump (145) will de-energize after master timer T34 times out.

When water is discharged through conduit (131), PV 52 (133) and PV 53 (135) open, filling the slurry tank (111) and clean brine tank (113) until the water reaches relay 2 of level controllers 3 (141) and level controller 4 (157), to fill the tanks for the next filter run. When the water reaches the level of relay 2 of controller 3 (141) and level controller 4 (157), pneumatic valves PV 52 (133) and PV 53 (135) close and pneumatic valve PV54 (137) opens, sending the water to the charcoal filter unit.

When the control panel switch on the control panel is switched to the off position, centrifugal pump (151) continues to operate. Pneumatic valve PV54 (137) remains open and the water continues to flow to the activated carbon filter (159), lowering the water in the housing of the diatomaceous earth filter (109). When the water level is lowered to normally closed relay 2 of level controller 5, differential centrifugal pump (151) is de-energized, pneumatic valve (127) closes, and timers T20 through T33 are energized, to remove the spent diatomaceous earth from the conical bottoms through pneumatic valves (125). Diaphragm pump (145) then starts, transferring the spent diatomaceous earth to sludge tank (180) enclosed in trailer (179). The spent diatomaceous earth will lower to the normally open contacts of relay 1 of controller 5. The contacts will close, causing timers T34 through T55 to energize, starting a sequence for solenoid valves 1 through 20. Pressure pump (146) is then energized to spray water from the clean brine tank (113) onto the filter elements (129) to remove debris. The diaphragm pump (145) will de-energize after master timer T34 times out. The contacts will open to de-energize diaphragm pump (145).

Master control unit 1000 can be coupled to one or more components shown in FIGS. 3A, 3B, 3C and 3D, including but not limited to centrifugal pump (119), level controller 5 (143), centrifugal pump, (115), centrifugal pump (151), pneumatic valves (127), timers T20 through T33, pneumatic valves (125), pneumatic valve (155), timer T19, PV 17, PV 50 (153), pneumatic valve PV18, pneumatic valve PV18, diaphragm pump (145), timers T34 through 55, solenoid valves 1 through 20, pressure pump (146), level controllers 3 (141), level controller 4 (157), pneumatic valves PV 52 (133) and PV 53 (135), pneumatic valve PV54 (137), or other suitable components, such as by using a wireless or wireline electrical and data connection, and can provide centralized system monitoring and control. Master control unit 1000 can generate user-configurable system monitoring and control interfaces, one or more connection indicators for a user to assist with the connection of modular piping, electrical and data connections, system testing protocols, run self-tests, generate system operation instructions and perform other suitable functions in support of the modular and user-configurable system disclosed herein.

Figure 4:
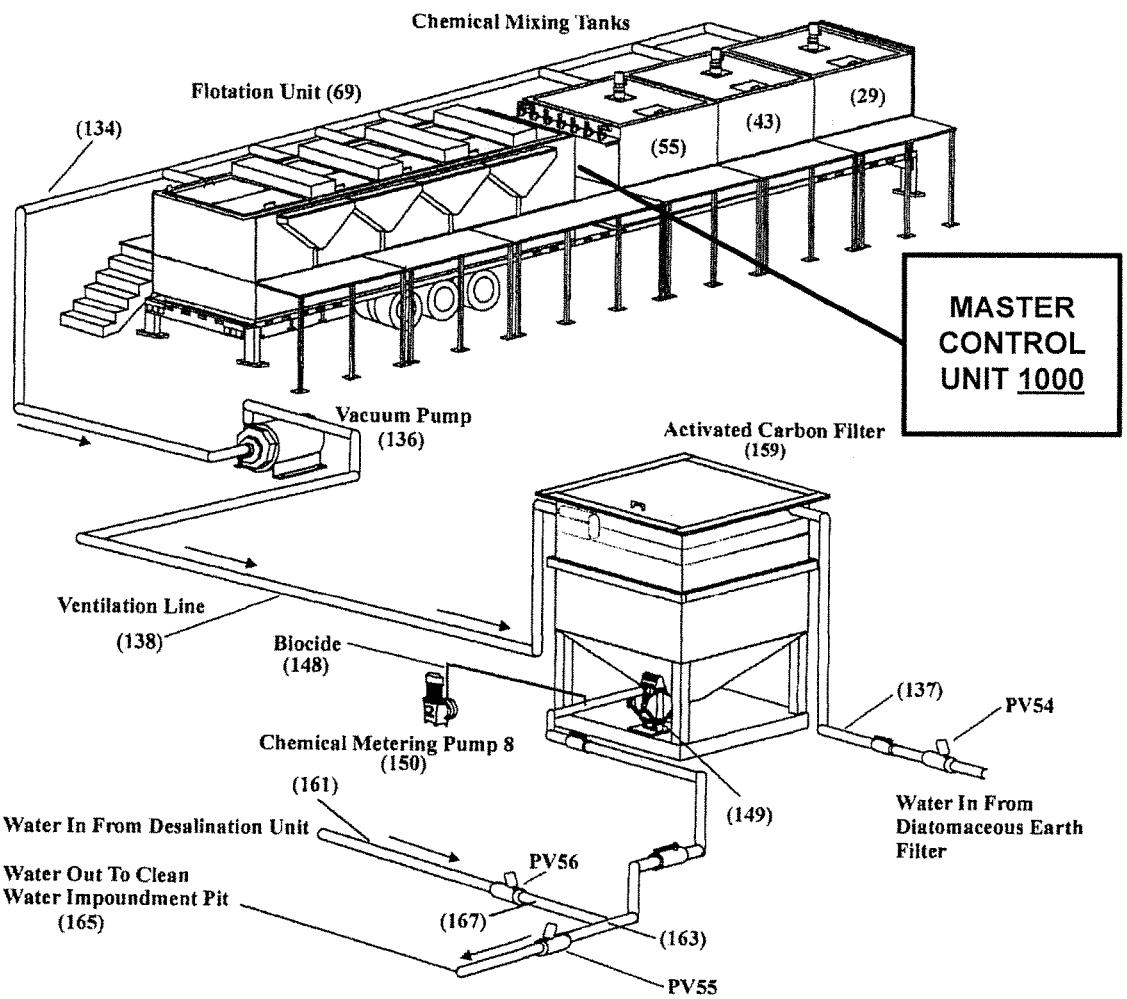
FIG. 4 is a diagram of an activated carbon filter, in accordance with an exemplary embodiment of the present disclosure.

FIG. 4 is a diagram of an activated carbon filter, in accordance with an exemplary embodiment of the present disclosure. Activated carbon filter (159) includes a housing filled with granular activated carbon. Water from the diatomaceous earth filter enters the unit through pneumatic valve PV 54, which is installed in-line with conduit (137). The water trickles through the activated carbon to remove dissolved organic matter, such as residual chemicals used in treatment processes, enzymes used in fracking processes, naturally-occurring bacteria and other organic matter. The water moves through the activated carbon and is pumped from the housing of the activated carbon filter (159) by diaphragm pump (149). A bacteria killing biocide (148) is injected into the discharge side of diaphragm pump (149) by chemical metering pump (150). The water flows through pneumatic valve PV55, which is installed in-line with conduit (163), before being transferred (165) into a clean water impoundment pit or into holding tanks. Water from the desalination unit enters the cleaned water reuse stream through PV56, which is installed in-line with conduit (161).

A ventilation system is attached to flotation unit (69) and chemical mixing tanks (29), (43) and (55) above the water surface, conduit (134), to pull the air by a vacuum pump (136) into activated carbon filter (159) through conduit (138), to remove airborne contaminants.

Desalinated water enters the clean water stream through pneumatic valve PV56, which can be installed in-line with conduit (161) when applicable, such as using the systems and processes disclosed in U.S. application Ser. No. 13/793, 238, entitled MOBILE WELL WATER DESALINIZATION SYSTEM AND METHOD OF OPERATION, filed Mar. 11, 2014, which is hereby incorporated by reference as if set forth herein in its entirety.

Master control unit 1000 can be coupled to one or more components shown in FIG. 4, including but not limited to diaphragm pump (149), chemical metering pump (150), pneumatic valve PV55, chemical mixing tanks (29), (43) and (55), pneumatic valve PV56, or other suitable components, such as by using a wireless or wireline electrical and data connection, and can provide centralized system monitoring and control. Master control unit 1000 can generate user-configurable system monitoring and control interfaces, one or more connection indicators for a user to assist with the connection of modular piping, electrical and data connections, system testing protocols, run self-tests, generate system operation instructions and perform other suitable functions in support of the modular and user-configurable system disclosed herein.

Figure 5A:
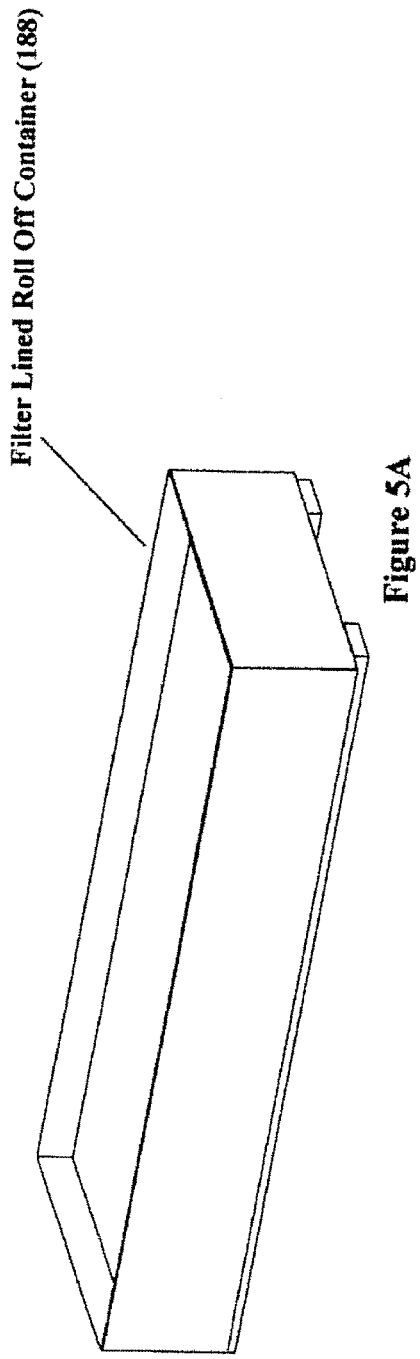
FIGS. 5A and 5B are diagrams of a sludge handling system, in accordance with an exemplary embodiment of the present disclosure.
Figure 5B:
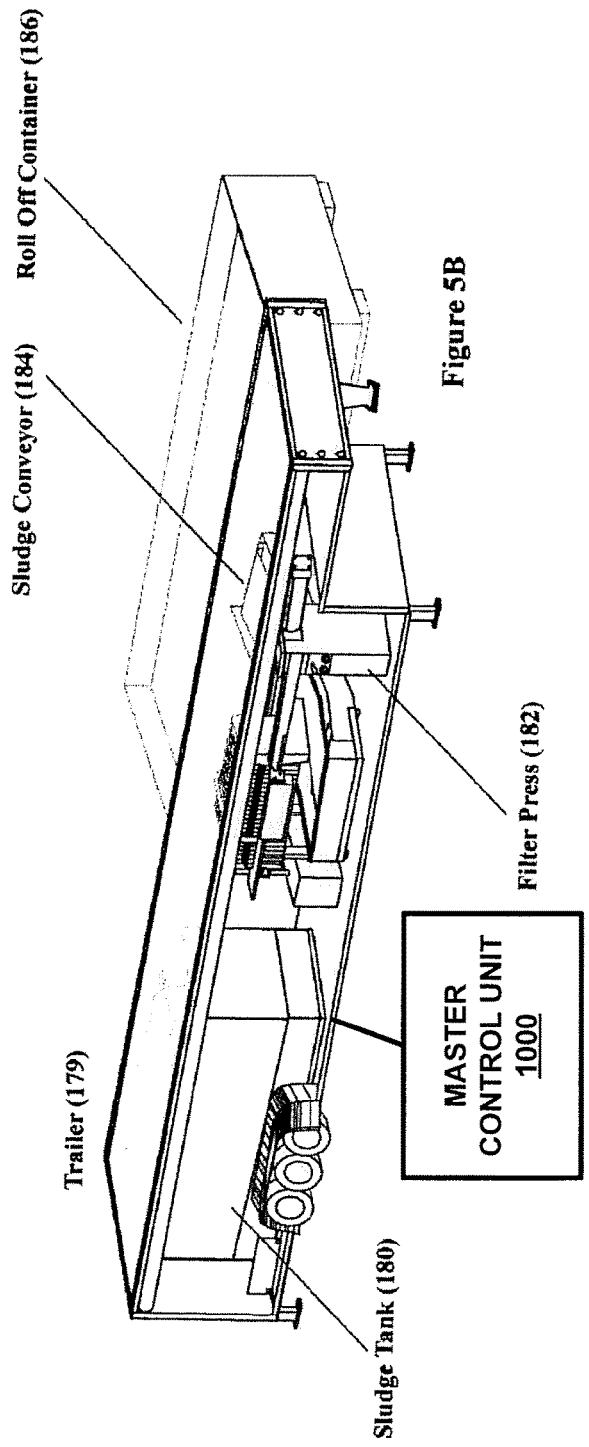

FIGS. 5A and 5B are diagrams of a sludge handling system, in accordance with an exemplary embodiment of the present disclosure. Sludge from flotation unit (69) and spent diatomaceous earth from diatomaceous earth filter unit (109) are pumped into sludge tank (180) or to filtered lined roll off container (188). The sludge in sludge tank (180) is pumped into filter press (182). The sludge is de-watered through filter press (182), creating "dry cakes" after the press is full. Filter press (182) is opened, allowing the "dry cakes" to drop onto a conveyor belt (184), and which are then moved into a roll off container for disposal. The filtrate from the filter press (182) is transferred into the clean impoundment pit for reuse. The sludge may also be pumped directly into a filter lined roll off container when applicable (188). The water flows through the filter liner, leaving the sludge behind. The water from the lined filter is transferred into a clean impoundment pit for reuse.

Master control unit 1000 can be coupled to one or more components shown in FIGS. 5A and 5B, including but not limited to filter press (182), conveyor belt (184), or other suitable components, such as by using a wireless or wireline electrical and data connection, and can provide centralized system monitoring and control. Master control unit 1000 can generate user-configurable system monitoring and control interfaces, one or more connection indicators for a user to assist with the connection of modular piping, electrical and data connections, system testing protocols, run self-tests, generate system operation instructions and perform other suitable functions in support of the modular and user-configurable system disclosed herein.

FIGS. 6A, 6B, 6C, 6D, 6E and 6F are diagrams of trailers, in accordance with an exemplary embodiment of the present disclosure. The disclosed trailer-mounted mobile system can be moved, such as when equipment that is used to develop a section of shale for recovery of oil and/or gas moves or in other suitable manners. The mobile system can be fully self-contained, can utilize a generator operating off of natural gas produced by the oil and gas companies, or other suitable power sources. Using generators to create electric power can help to prevent down time and freeze ups during the winter months, when compared to using electrical grid power sources that can incur power outages due to ice storms or electrical storms. Another advantage to the use of generators is that the oil companies do not have to supply electrical power to the treatment site, as electric power is frequently not available. The trailers can fit together to create a large working area for the operator, can be winterized to treat water in the coldest weather and can have other suitable features to facilitate use. The disclosed trailer design interlocks the components so as to provide communication between the trailers, to prevent over flows and to facilitate other events, such as when one component is needed to make an event happen to a different component. The trailers can be set up and taken down quickly, such as to facilitate moving the trailers to another location.

Sludge handling trailer (179) contains a filter press to de-water the sludge generated from diatomaceous earth filter (109) and flotation unit (69). Sludge tank (180) receives the sludge to feed filter press (182). The spent diatomaceous earth, when combined with the sludge from the flotation unit (69) gives the sludge grit, which aids in the de-watering process. In one exemplary embodiment, the trailer (179) can be a 42' gooseneck trailer that can be pulled with a 1 ton dually pickup, or other suitable trailers.

Chemical trailer (177) can be configured the same as sludge trailer (179). Chemical trailer (177) can contain a sufficient amount of chemicals in totes to supply the system for one day. A secondary trailer can be provided with additional chemicals, which can be utilized to replace the existing trailer being used. In this manner, the trailers can be switched without shutting down the system, to maintain a constant flow of treated water, without any water being untreated.

The components are placed in their respected trailers as shown in FIG. 6. FIG. 6A (169) shows the desalination unit in the trailer, FIG. 6B shows the diatomaceous earth filter (109) in its trailer (171) and FIG. 6C shows the flotation unit (69) in its trailer (173).

FIGS. 7A, 7B and 7C are diagrams of a system setup, in accordance with an exemplary embodiment of the present disclosure. The trailer shown in FIG. 7A at (181) can be moved to a worksite in a conventional manner. Once at the site, the tarp sides are rolled upwards at (183), the down riggers are dropped at (195), and the tarp supports are moved to each side of the trailer at (185), as shown in FIG. 7B. The roof of the trailer is raised at (181), such as manually or by utilizing pneumatic cylinders (191). The hinged walkways (197) are raised, and the walkway supports (189) are put in place. A section of the support tracks (193) is raised by standing on the hinged walkway (197).

FIG. 8 is a diagram of a work space, in accordance with an exemplary embodiment of the present disclosure. The hinged walkways (197) are raised, and the walkway supports (189) are put in place. A section of the support tracks (193) is raised by standing on the hinged walkway (197). The mobile wastewater systems unique design allows space for the operator to perform needed tasks. The hinged insulated walkways (197) attached to each component front and back in trailers (181) can have a suitable width, such as 3', and can extend the length of trailers, such as 50'. When multiple trailers are staged parallel to each other and the insulated walkways raised, a 6'×50' work space can be created between each trailer (181) in this manner. The internal components of each trailer can further include a 3' walk space between the major components, to allow the operator to move from one trailer to the other without leaving any trailer.

Figure 9:
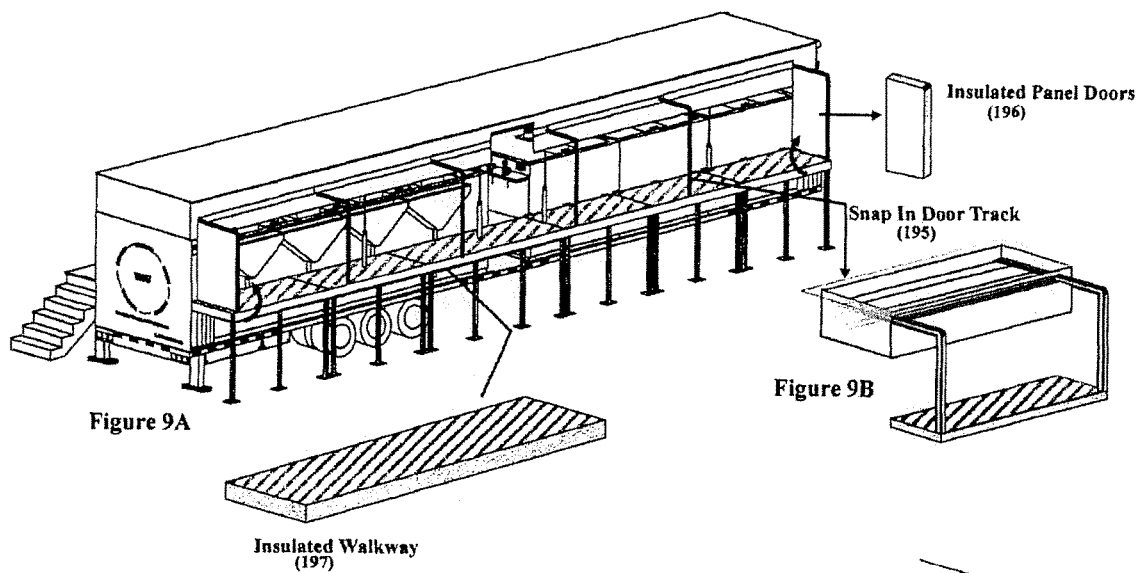
FIGS. 9A, 9B, 9C and 9D are diagrams of how the system is enclosed, in accordance with an exemplary embodiment of the present disclosure.
Figure 9:
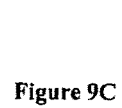
Figure 9:
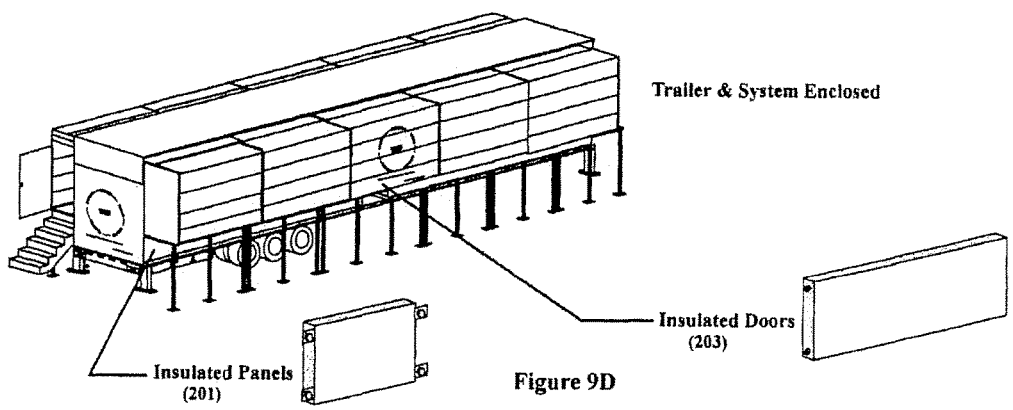
Figure 10:
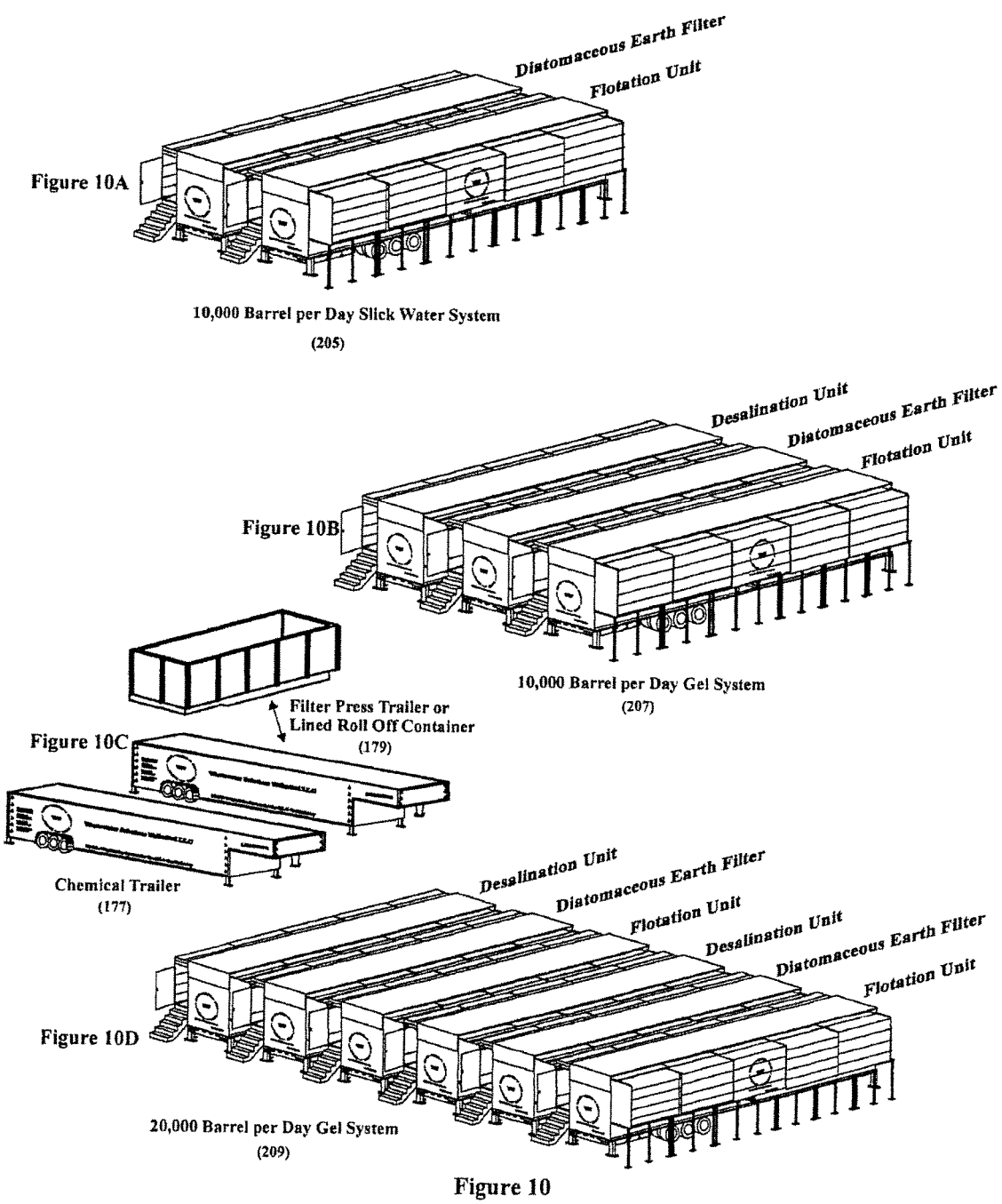
FIGS. 10A, 10B, 10C and 10D are diagrams of how the system is expanded, in accordance with an exemplary embodiment of the present disclosure.

FIGS. 9A, 9B, 9C and 9D are diagrams of how the system is enclosed, in accordance with an exemplary embodiment of the present disclosure. As shown, the system is completely enclosed to provide protection against freezing and to shelter the operator during cold weather months. The insulated walkways (197) can be raised as shown in FIG. 7D. Overhead door tracks (195) can be snapped onto permanent tracks staged in the overhead compartments, as shown in FIG. 9B. After the tracks (195) are in place, the insulated overhead doors (203) can be rolled down (199). After the insulated walkways (197) are raised, insulated panels (201) can be positioned to cover the base of the trailer, where pumps, pipes and other components are installed, to provide additional protection against freezing. Hinged insulated panel doors (196) can be attached to the insulated walkways (197) and raised to cover the ends of the insulated overhead doors (203). This complete setup is performed on both front and rear of the trailer (181) when used singularly, as shown in FIG. 9D. When placing more than one trailer (181) side by side, only the outside doors need to be closed, as shown in FIG. 10A.

When the system is set up, the interior roll down doors (199) can be left in the "up" position to create a large room for the operator. The outside doors (199) can be rolled down to enclose the system for protection against freezing. Alternatively, the outside doors (199) can be rolled up and the insulated panel doors (196) can be easily removed for ventilation when external temperatures are high. When the doors are removed, a temporary hand rail can be used to replace the doors to meet OSHA requirements.

The system can be powered by electric generators operating off of natural gas, as discussed. On the distillation unit, an electric powered boiler can be used to eliminate open flames, which might be prohibited in certain operational environments.

The insulated walkways can be fabricated utilizing aluminum grip strut, to reduce the risk of slipping. The use of aluminum walkways and the aluminum walkway supports reduces the weight of these components, to facilitate the ease of assembly.

FIGS. 10A, 10B, 10C and 10D are diagrams showing how the system is expanded, in accordance with an exemplary embodiment of the present disclosure. In FIG. 10A, a flotation unit and a diatomaceous earth filter are shown. A chemical trailer and a sludge trailer can also or alternatively be used. The system as shown can process approximately 10,000 barrels a day, such as for slick water fracking applications or other suitable applications.

In FIG. 10B, a flotation unit, diatomaceous earth filter, carbon filter and a desalination unit is shown. A chemical trailer and a sludge trailer can also or alternatively be used. The system as shown can process approximately 10,000 barrels a day, such as for gel fracking applications or other suitable applications. The desalination system can be used to dilute the clean brine water when necessary, such as for gel fracking. A portion of the heat from the steam can be used to heat the trailers when needed, otherwise the steam can be released to the environment.

As shown in FIG. 10C, the chemical trailer can contain the necessary chemicals to treat 10,000 barrels per day of flow-back or produced water. A secondary trailer with a full load of chemicals can be provided at the site to replace the trailer that is currently being used for treatment, and the chemical container outlets can be connected by pipes to a central location. The supply lines can be quick coupled and have valves that are configured to facilitate a swap of trailers, to continuously supply chemicals to the waste stream without shutting the system down, and so that no water flows through the system untreated. The chemical trailers can be a 42' gooseneck trailer or other suitable vehicles, such as one that can be moved by a 1 ton dually pickup.

The filter press and the sludge tank can be contained in the sludge trailer or in other suitable locations. The sludge tank can used for a receiver to collect sludge from the flotation unit and the diatomaceous earth filter. The sludge from the sludge tank can be pumped to the filter press to be dewatered, separating the solids from the liquid. When the press is full, it can be opened automatically or by the operator and "dry cakes" can be dropped onto a conveyor belt and conveyed into a roll off container for disposal. The filtrate (water) from the press can be recovered and returned to the waste stream for treatment, sent directly to a clean water impoundment pit or otherwise utilized.

FIG. 10D is an illustration of system expansion by adding trailers. The system as shown can clean a selected volume of contaminated water by increasing the number of trailers. Each trailer can be electrically connected to an adjacent trailer to electrically interlock the components and to prevent overflows. When operations such as drilling and fracking are completed in an area, a portion of the equipment can be moved to a new location, while sufficient equipment can be left behind to clean produced water that is present on each active well. In one exemplary embodiment, two chemical trailers and two sludge trailers can also or alternatively be used to process approximately 20,000 barrel per day of contaminated water.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A mobile wastewater treatment facility, comprising:
   a first vehicle having one or more desalination systems;
   a second vehicle having one or more water treatment systems, the water treatment systems comprise one of a filter system, a flotation system, a chemical treatment system, a filter press system, and a sludge processing system; and
   wherein the first vehicle and the second vehicle are modular, and the first water treatment systems and second water treatment systems are configurable in combination to process contaminated water as a function of the type of contamination.

2. The mobile wastewater treatment facility of claim 1 wherein the first vehicle and the second vehicle comprise modular interfacing electrical and pipe connections on each side of each vehicle that can be coupled to adjacent modular interfacing electrical and pipe connections.

3. The mobile wastewater treatment facility of claim 1 wherein the first vehicle and the second vehicle comprise modular interfacing walkways on each side of each vehicle that can be coupled to an adjacent modular interfacing walkway.

4. The mobile wastewater treatment facility of claim 1 wherein the first vehicle and the second vehicle comprise modular interfacing weather protection features on each side of each vehicle that can be coupled to an adjacent modular interfacing weather protection feature.

5. The mobile wastewater treatment facility of claim 1 wherein the chemical treatment systems comprises a plurality of chemical mixing tanks, each having an associated metering pump, a mixing device and a modular connection to the first vehicle.

6. The mobile wastewater treatment facility of claim 1 wherein the flotation systems comprises a plurality of rake systems, each having an associated hopper and a modular connection to the first vehicle.

7. The mobile wastewater treatment facility of claim 1 wherein the desalination systems comprises a plurality of filter units, a slurry tank, a clean brine tank and a modular connection to the second vehicle.

8. The mobile wastewater treatment facility of claim 1 wherein the sludge processing systems comprises a sludge tank, a filter press, a sludge conveyor and a modular connection to the first vehicle.

9. The mobile wastewater treatment facility of claim 1 further comprising a third vehicle having one or more third water treatment systems; and
   wherein the first vehicle, the second vehicle and the third vehicle are modular, and the first water treatment systems, the second water treatment systems and the third water treatment systems are configurable in combination to process contaminated water as a function of the type of contamination.

10. The mobile wastewater treatment facility of claim 9 wherein the second water treatment systems comprise a filter system and the third water treatment systems comprise a flotation system.

11. The mobile wastewater treatment facility of claim 9 wherein the second water treatment systems comprise a filter system and the third water treatment systems comprise a chemical treatment system.

12. The mobile wastewater treatment facility of claim 9 wherein the second water treatment systems comprise a filter system and the third water treatment systems comprise a filter press system.

13. The mobile wastewater treatment facility of claim 9 wherein the second water treatment systems comprise a filter system and the third water treatment systems comprise a sludge processing system.

14. A mobile wastewater treatment facility, comprising:
   a first vehicle having one or more first water treatment systems that include a desalination system ;
   a second vehicle having one or more second water treatment systems that include a filter system;
   a third vehicle having one or more third water treatment systems that include a flotation system having a plurality of rake systems, each having an associated hopper and a modular connection to the second vehicle, a plurality of chemical mixing tanks, each chemical mixing tank having an associated metering pump, a mixing device and a modular connection to the second vehicle;
   a fourth vehicle having one or more fourth water treatment system that include a chemical treatment system;
   a fifth vehicle having one or more fifth water treatment systems that include a sludge treatment system having a plurality of filter units, a slurry tank, a clean brine tank and a modular connection to the second vehicle, and a sludge tank, a filter press, a sludge conveyor and a modular connection to the second vehicle;
   wherein the first vehicle, the second vehicle, the third vehicle, the fourth vehicle and the fifth vehicle are modular, and the first water treatment systems, the second water treatment systems, the third water treatment systems, the fourth water treatment systems and the fifth water treatment systems are configurable in combination to process contaminated water as a function of the type of contamination;

wherein the first vehicle and the second vehicle comprise modular interfacing electrical and pipe connections on each side of each vehicle that can be coupled to adjacent modular interfacing electrical and pipe connections;

wherein the first vehicle, the second vehicle, the third vehicle, the fourth vehicle and the fifth vehicle comprise modular interfacing walkways on each side of each vehicle that can be coupled to an adjacent modular interfacing walkway; and wherein the first vehicle, the second vehicle, the third vehicle, the fourth vehicle and the fifth vehicle comprise modular interfacing weather protection features on each side of each vehicle that can be coupled to an adjacent modular interfacing weather protection feature.

* * * * *